United States Patent [19]

Pailles et al.

[11] Patent Number: 5,740,232

[45] Date of Patent: Apr. 14, 1998

[54] SMART CARD BASED SYSTEM FOR TELEPHONE-SECURIZED TRANSACTIONS

[75] Inventors: Jean-Claude Pailles, Epnon; Jacques Delaballe, Meudon, both of France

[73] Assignees: France Telecom, Paris; La Poste, Boulogne Billancourt; Cogecom, Paris, all of France

[21] Appl. No.: 569,132

[22] PCT Filed: May 5, 1995

[86] PCT No.: PCT/FR95/00591

§ 371 Date: Apr. 15, 1996

§ 102(e) Date: Apr. 15, 1996

[87] PCT Pub. No.: WO95/30975

PCT Pub. Date: Nov. 16, 1995

[30] Foreign Application Priority Data

May 6, 1994 [FR] France ................................. 94 05615

[51] Int. Cl.$^6$ ............................................. H04M 11/00
[52] U.S. Cl. ........................... 379/93.02; 379/93.26
[58] Field of Search ................... 379/91, 95, 97–99, 379/93, 354–357, 67, 68, 102, 104, 105, 361, 441, 443, 444, 91.01, 93.02, 93.03, 93.12, 93.26, 93.28, 93.37

[56] References Cited

U.S. PATENT DOCUMENTS

| | | | |
|---|---|---|---|
| 4,799,254 | 1/1989 | Dayton et al. | 379/97 |
| 5,561,710 | 10/1996 | Helms | 379/99 |

FOREIGN PATENT DOCUMENTS

| | | | |
|---|---|---|---|
| 61-136362 | 6/1986 | Japan | 379/97 |
| WO8803294 | 5/1988 | WIPO | 379/91 |

OTHER PUBLICATIONS

"Build This Pocket Data Terminal" by Charles Edwards, *Radio-Electronics*, Jan. 1976, pp. 29–32.

*Primary Examiner*—Wing F. Chan
*Attorney, Agent, or Firm*—Oblon, Spivak, McClelland, Maier & Neustadt, P.C.

[57] ABSTRACT

A Smart Card Based System for telephone-securized transactions. The system includes a telephone terminal (10) connected to a server (30) and a package or unit (40) incorporating a keypad (42), a smart card (48) and sound signal transmission device. The transmission of the information of the card to the server takes place by way of sound signals and the telephone terminal. In the other direction, the information is addressed in vocal manner to the user, who types them on the keypad (42) of the unit (40). Application to securized teletransactions, particularly electronic funds transfer.

2 Claims, 6 Drawing Sheets

SMART CARD BASED SYSTEM FOR TELEPHONE-SECURIZED TRANSACTIONS

DESCRIPTION

1. Technical Field

The present invention relates to a system for telephone-securized transactions. It has applications in electronic funds transfer, televoting, games, remote betting, etc.

2. Prior Art

Teletransactions or remote transactions have developed to a significant extent over the past few years. They make use of the telephone network connecting a telephone terminal to a server. The latter sends vocal messages to the user, who replies using the keys of the telephone terminal keypad. The signals addressed in return to the server are generally of the dual tone multi-frequency or DTMF type.

In the most highly evolved systems, the server is able to interpret certain words spoken by the user and taken from within a restricted vocabulary.

In this particular use of the telephone, there is a vital need for security when the transaction is of the monetary type (electronic funds transfer) and in more general terms whenever there are risks of fraud.

In order to meet this need, it is possible to equip a telephone terminal with a data processing power outlet of type RS 232 and connect to it a smart card reader (generally known under the abbreviation LECAM), said reader incorporating a software and means appropriate for the transmission and reception of data intended for and coming from the server. In this card reader is inserted a smart card able to fulfil security functions, such as the checking of a confidential code, the authentication of an external entity, the assistance in the authentication of the card by an external entity, the recording of a right, etc. These functions involve algorithms using cryptographic codes, random drawing of numbers, comparisons, etc.

Although these means are satisfactory, they suffer from the disadvantage of requiring telephone terminals equipped with a data processing peripheral power outlet. However, ordinary telephone terminals are not generally equipped with such a power outlet, so that it is necessary to change terminal in order to perform such securized transactions.

The present invention aims at obviating this disadvantage by offering a simple way to perform teletransactions using standard telephone terminals.

DESCRIPTION OF THE INVENTION

To this end, the invention proposes associating with the standard telephone terminal securizing means constituted by a portable package or unit equipped with a keypad, a display and a sound signal transmitter able to cooperate with the telephone terminal transmitter, said unit being able to accept a smart card able to perform security functions. This card is connected to the keypad, to the display and to the sound signal transmitter.

The information exchange necessary for securizing a transaction then takes place in a different manner as a function of the direction of the information. In the card-server direction, it is the sound transmitter of the unit and the transmitter of the telephone terminal which ensure the connection by the bias of the sound signals transmitted by the unit. In the server-card direction, it is the telephone terminal loudspeaker, the user and the keypad which ensure the connection, the user typing the vocal message supplied by the loudspeaker to the keypad so that said message is transmitted to the card.

Therefore the user is one of the links of the transmission chain in the server-card direction. In the other direction (card-server), the transmission is automatic. However, this intervention on the part of the operator causes no problem because, in practice, the message transmitted by the server is generally short consisting of a few, e.g. four digits which are usually sufficient to ensure the security functions.

It should be noted that units equipped with a DTMF acoustic transmitter able to cooperate with a telephone terminal already exist, particularly for automatically dialling telephone numbers. If these units contain memories, they contain no smart cards able to implement security algorithms and they require no intervention on the part of the user in one or other transmission direction.

The portable unit usable in the present invention can be of a particular type called CARTULETTE (registered trademark) by the applicant. This is a unit containing a smart card and which is equipped with a display and a keypad. The CARTULETTE is in particular used for checking the content of a smart card.

DETAILED DESCRIPTION OF EMBODIMENTS

Figure 1:
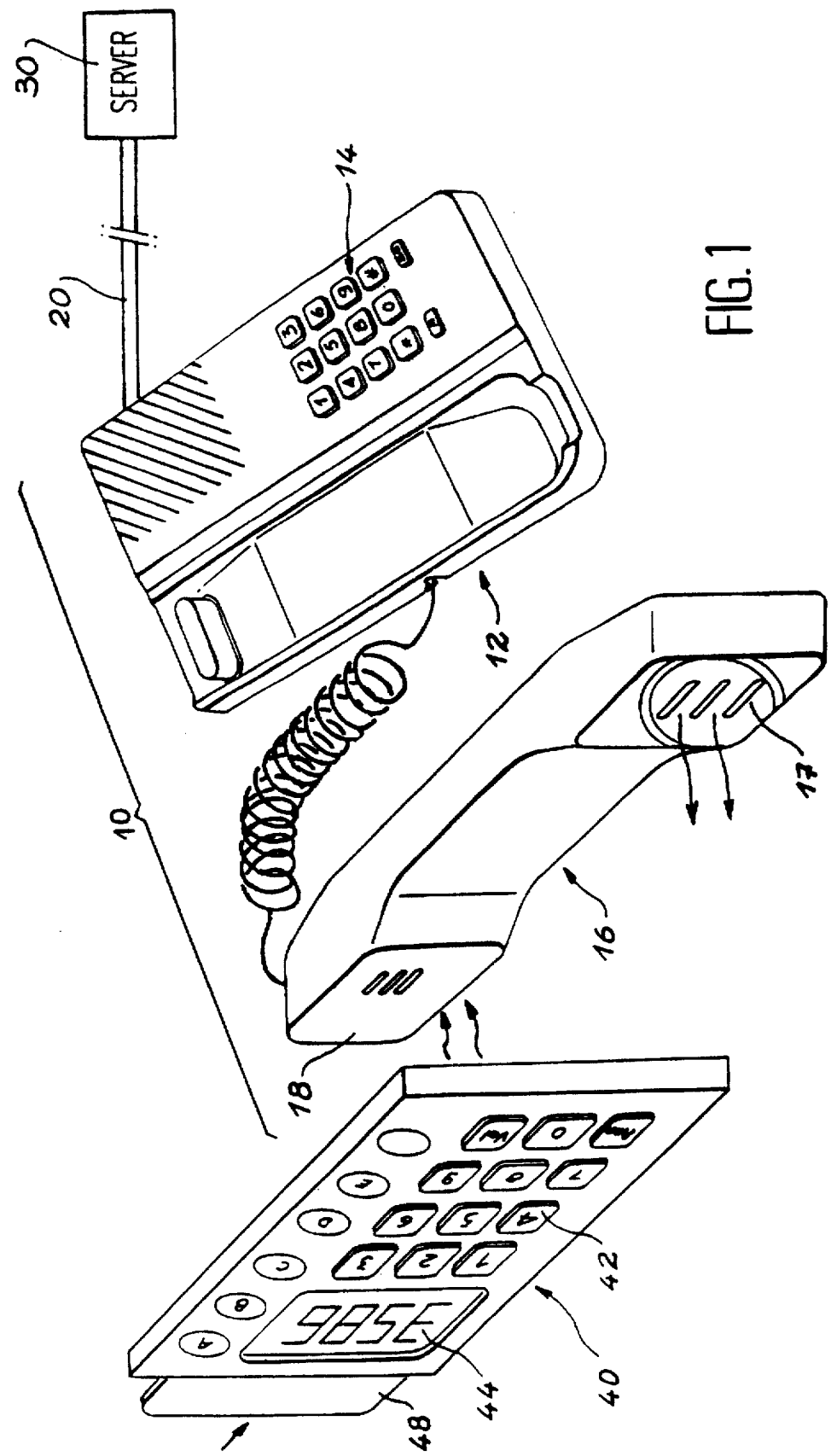
FIG. 1 shows the general diagram of the system according to the invention.

FIG. 1 shows a system according to the invention having a telephone terminal 10 connected by a telephone network 20 to a server 30, as well as a portable package or unit 40. The terminal 10 in conventional manner comprises a station 12 with a keypad 14 and a receiver 16 equipped with a loudspeaker 17 and a microphone 18.

Figures 2A, 2B:
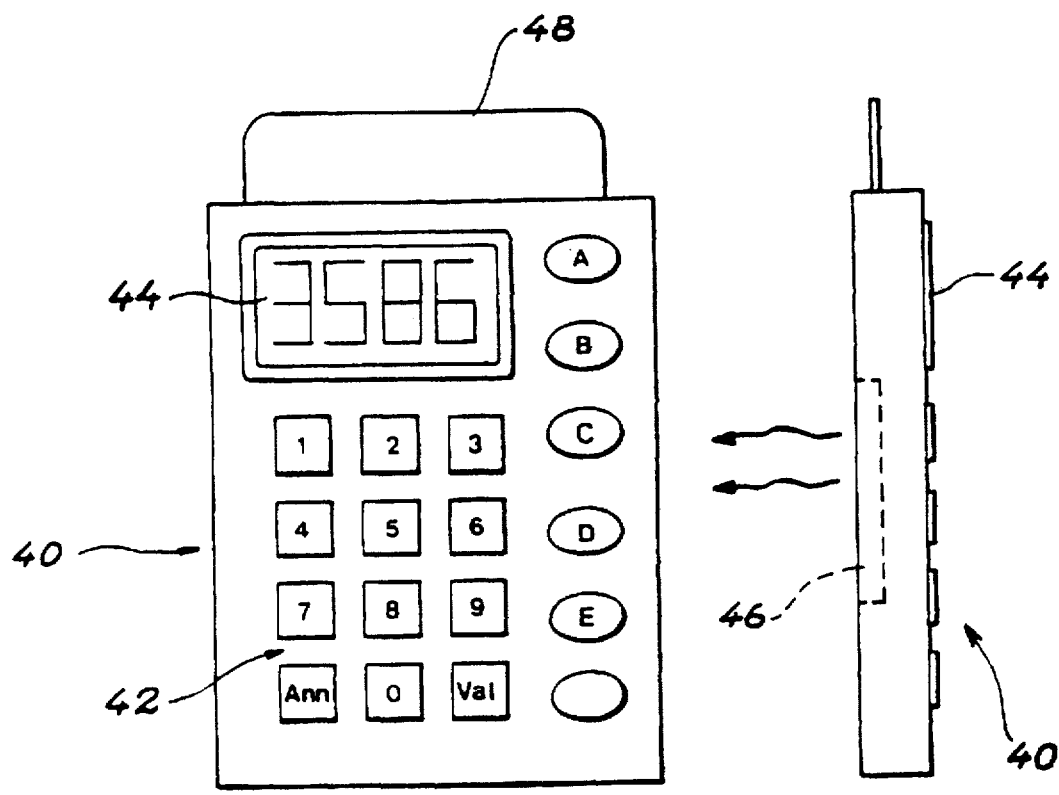
FIGS. 2a and 2b show the unit in front view and side view.

With said terminal 10 is associated a portable package or unit 40 incorporating a keypad 42, a display 44 and a smart card 48 which, for greater clarity, is shown projecting slightly, but which in normal operation is entirely introduced into the unit. The unit 40 also comprises, at the rear, means for transmitting sound signals (as can be seen in FIG. 2b). In operation, the unit is engaged against the transmitter 18 of the telephone handset 16, the sound transmission means facing the transmitter.

FIG. 2a shows the unit in front view and FIG. 2b in profile view. Naturally this only constitutes an exemplified embodiment. On the front face, the keys A, B, C, D and E are keys having specific functions of the envisaged application, namely electronic funds transfer, televoting, games, betting, etc. The key Ann is used for cancelling characters which have been typed and displayed on the screen. The key Val is used for validating the typed characters and for advancing the user-unit dialogue. The key SEND is used for sending a message to the server. In practice, it is necessary for the transmission only to commence after a few seconds, so as to enable the user to place the unit 40 on the telephone handset transmitter. FIG. 2b shows, to the rear of the unit, means 46 able to transmit sound signals, e.g. of the DTMF type.

Figure 3:
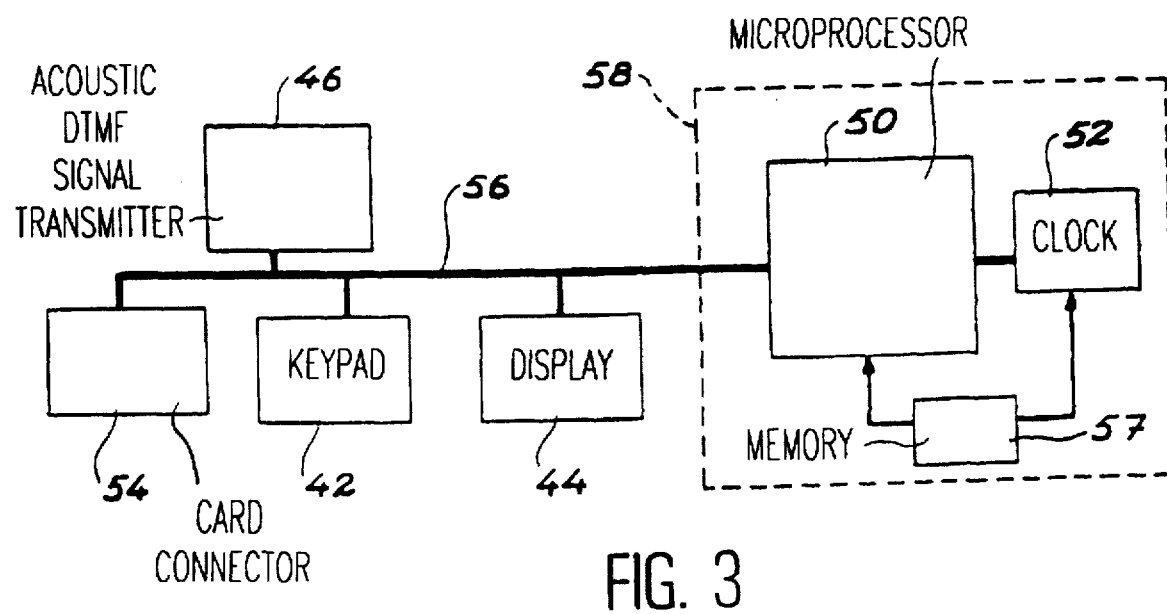
FIG. 3 shows the functional organization of the unit.

FIG. 3 shows the functional organization of the unit and its card. It is possible to see therein the keypad 42, display 44, acoustic signal transmission means DTMF 46. It is also possible to see a microprocessor 50, a clock 52 and a card connector 54, all said members being interconnected by a bus 56. A physical protection 58 can surround the microprocessor 50 and the clock 52.

The microprocessor comprises read only memories (ROM) and random access memories (RAM) 57. The clock is used when it is necessary to time stamp an operation performed by the user to permit subsequent checks on the time and date of said operation. In order to prevent certain frauds, it is appropriate to proceed in such a way that it is impossible to move the clock forward or backwards. This is the function of the physical protection 58 placed around the microprocessor-clock assembly.

Before describing a few examples of teletransactions which can be performed with the system according to the invention, reference is made to a few security functions which can be fulfilled by a conventional smart card. Such smart cards are generally introduced into a terminal equipped with a keypad and a display, such as is e.g. the case for cash dispensers.

Hereinafter, k will be used for a cryptographic code, knowing that each card and each security function can have a specific code. However, for simplification purposes it will be assumed that there is only a single code k.

A smart card placed in a terminal can fulfil at least the five following functions:

a) Checking a confidential code (CC)

The terminal sends a confidential code CC to the card, which checks if the code received is identical to the code stored. If this is not the case, the card positions an internal indicator so as not to accept other instructions. Thus, a count permits a definitive blocking, if three false codes have been presented successively. In all cases, a response is sent to the outside.

b) Authentication of the card and all or part of its content by an external entity The terminal requests the card to authenticate its content M, e.g. defined by an address and a length. The terminal then also sends (to avoid frauds by reactivation), a random variable x. The card calculates $y=Fk(M,x)$, in which k is the code dedicated to this security function and F is the cryptographic function of the card (e.g. algorithm DES).

c) Authentication of the card and external data

The operation is identical to operation b), where addition takes place to the content M of a data item T supplied at the same time as x to the card.

d) Authentication by the card of a distant entity

The external entity requests a random variable from the card. The card calculates a random variable x with the aid of a pseudorandom generator and sends it to the external entity, which performs a calculation $y=Fk(x)$, where k is the code dedicated to this function. The external entity knows this code, if it is authentic. The entity sends the result y of the calculation to the card for checking. The card performs the same calculation $y'=Fk(x)$, in which k is the code dedicated to this function and which it also knows. The card then checks that the result y which it has found is identical to the result y which the external entity had transmitted to it. The card sends a response as a consequence thereof. If the test is negative, the card can inhibit the following instructions.

e) Recording of a right in the card, conditioned to the authentication of the external entity with respect to the card The external entity requests a random variable from the card. The card calculates a random variable x with the aid of a pseudorandom generator and sends it to the external entity. The external entity performs a calculation $y=Fk(D,x)$, in which k is the code dedicated to this function and D is a right which it knows, if it is authentic. The knowledge of the code in general requires the knowledge by the entity of the number of the card, so that it can reconstitute the specific code for such function. The right D is an information indicating to the card that it is e.g. necessary to modify a certain number of bytes at a particular address and the new value of said bytes. Such functions are e.g. found when it is a matter of refilling a cash card. The entity sends y and D to the card for implementation. The card performs the same calculation and finds a result $y'=Fd(D,x)$, in which k is the code dedicated to this function and which is also known by the card. The card checks that y'=y and, in the affirmative, implements the updating instruction and then sends a response as a consequence thereof.

All these conventional functions can be taken up and/or adapted in the case of the invention.

a) Checking a confidential code

The code in question is entered on the keypad of the unit and presented to the card contained in said unit. The display displays a message, which is a function of the response supplied by the card. The implementation of this function is consequently not really specific to the invention.

b) Authentication of the card and its content

Figure 4:
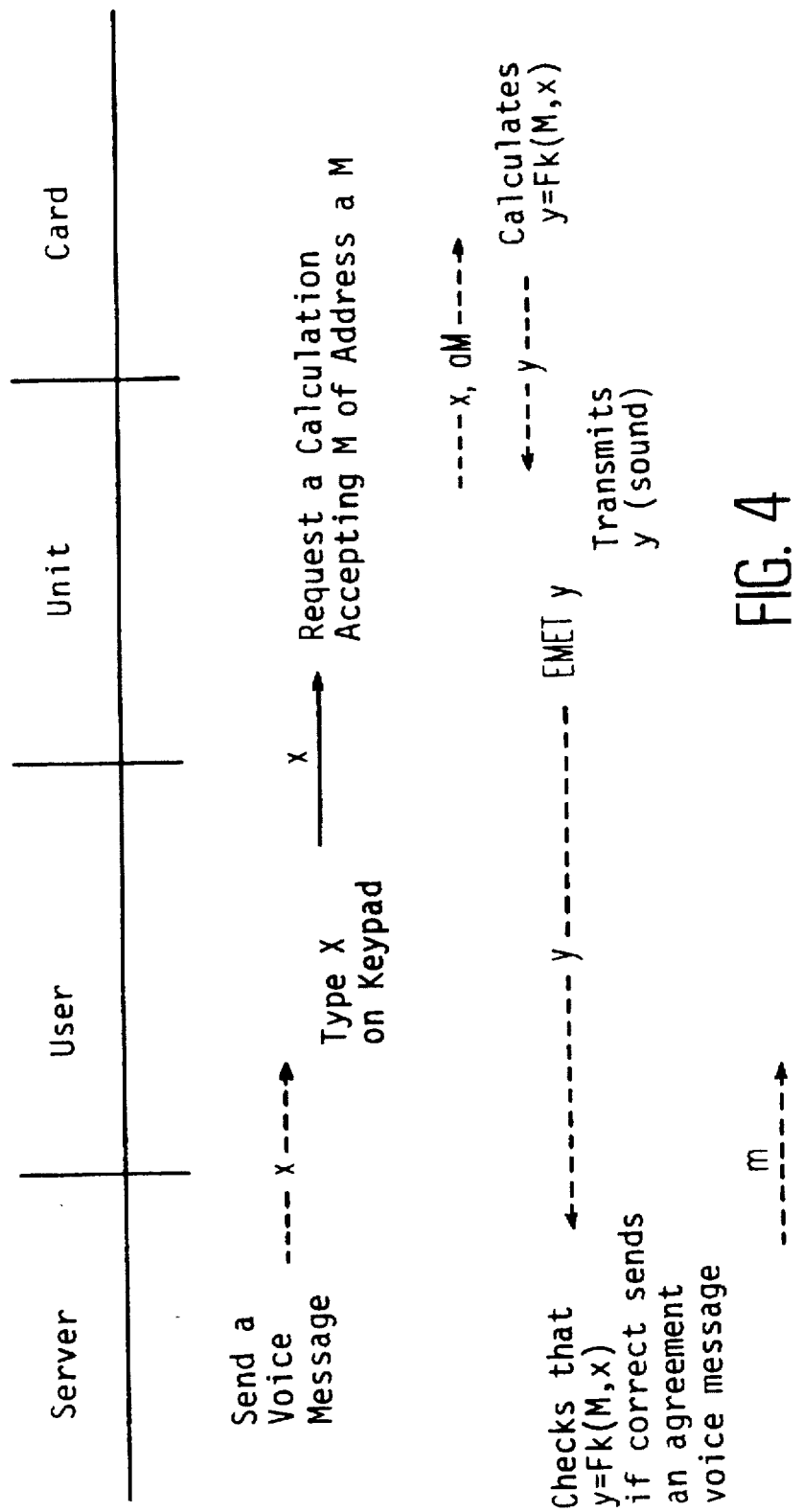
FIG. 4 shows a first message exchange diagram between a server and a card.

The server checks that the card with which the communication is established is authentic. An example where this function is required is a bank transaction, where M is the amount of the transaction recorded in the card memory. This transaction is illustrated in FIG. 4 where, as in the following representations, the information transmission in the unit is symbolized by a continuous line arrow, which means that the user uses the keypad for introducing said information. The other information transmissions are represented by broken line arrows and represent sound signals (DTMF).

The following operations are performed in FIG. 4:

the server sends a voice message x, the user types the message x on the keypad of the unit, the unit requests the card which it contains to perform a certain calculation individual to the transaction M, which is indicated by an address aM in the card memory, so that the unit transmits M and aM to the card, the card calculates a quantity y equal to Fk(M,x), in which k is the code and F a cryptographic function parametrized by k, the card sends y to the unit, which transmits it by a sound signal directly to the server and with no intervention on the part of the user, the server checks that y is equal to the quantity Fk(M,x) which it has been able to calculate elsewhere and if identity is established the server sends an agreement sound message m to the user.

c) Authentication of the card and external data

An example of use of said function is the case where the server wishes to authenticate that an action has taken place in the unit of the user prior to a given time D. This action has been stored in the card at a time T=T1. It can e.g. be a vote, or a bet, or a game. The quantity M consequently contains the result of this action and T1 the time indicated by the clock. It is assumed that the unit does not necessarily have the same time as the server, e.g. due to a desynchronization of the clocks. The server will therefore test the durations relative to the unit and to the server between the instant of the vote and the instant of the teletransaction. During the transaction with the server, the indication of the unit clock is T=T2 and that of the server is D'. After checking the calculation performed in the card, the server will test that the time T2−T1 exceeds D'−D.

Figure 5:
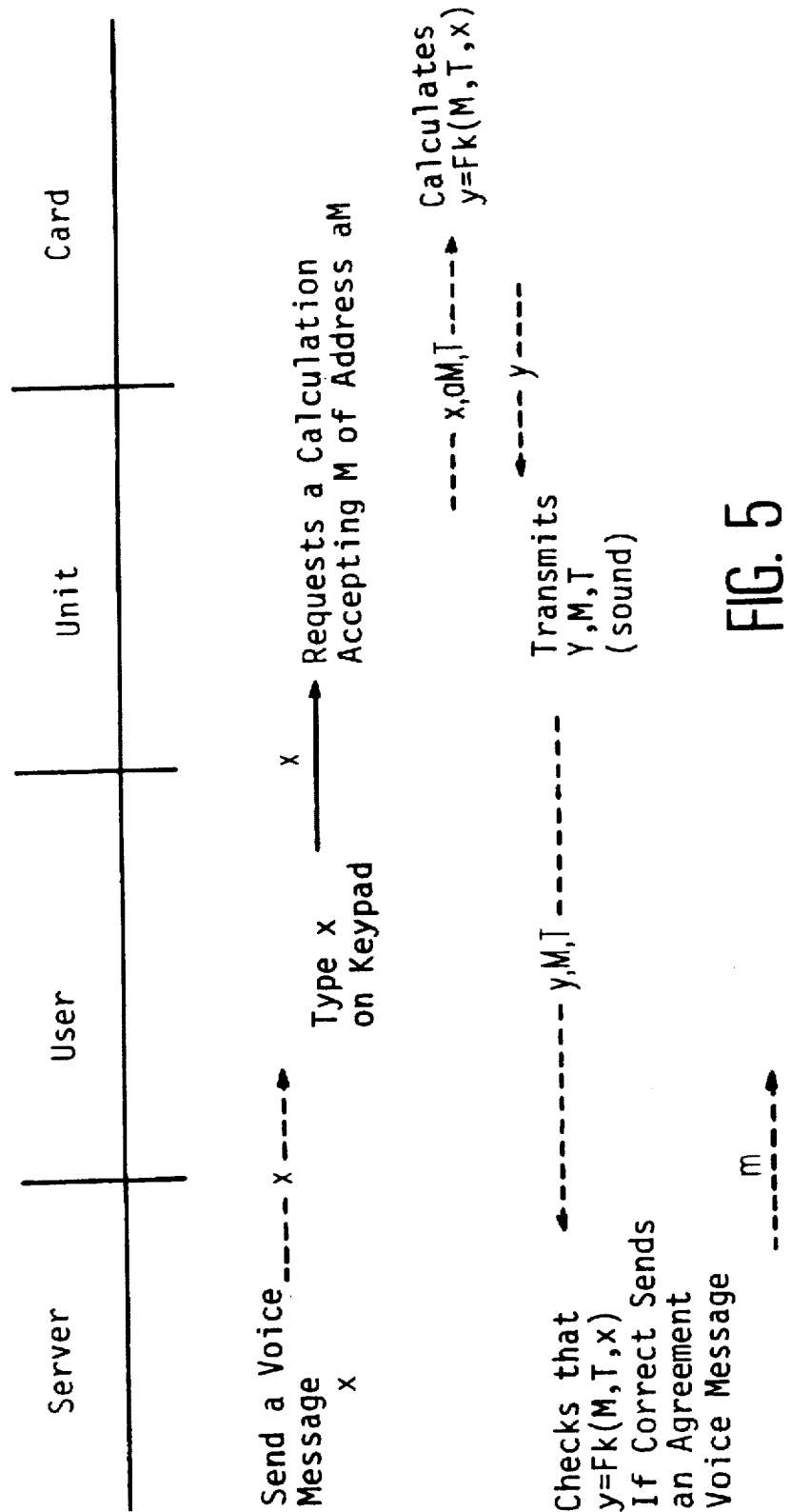
FIG. 5 shows a second message exchange diagram between a server and a card.

The sequence of operations is illustrated in FIG. 5 and is as follows:

the server sends a voice message x, the user types x on the keypad, the unit requests the card to perform a calculation individual to M of address aM and thus transmits to the card x, aM and T, the card calculates $y=Fk(M,T,x)$, the unit transmits y, M and T by sound signals, the server checks that the y received is equal to the precalculated quantity $Fk(M,T,x)$, in the case of agreement, the server sends an agreement message m to the user.

d) Authentication by the card of a distant unit

The user wishes to check that the server is authentic, i.e. that it is authorized by a superior authority which has supplied it with the secret code k, which is also contained in the card. The server demonstrates that it knows this code by performing the same calculation as the card on a number x drawn at random by the latter. The result obtained by the server, namely y' is sent to the user, who types it on the keypad. The unit can therefore inform the user of the success or failure of the server authentication.

Figure 6:
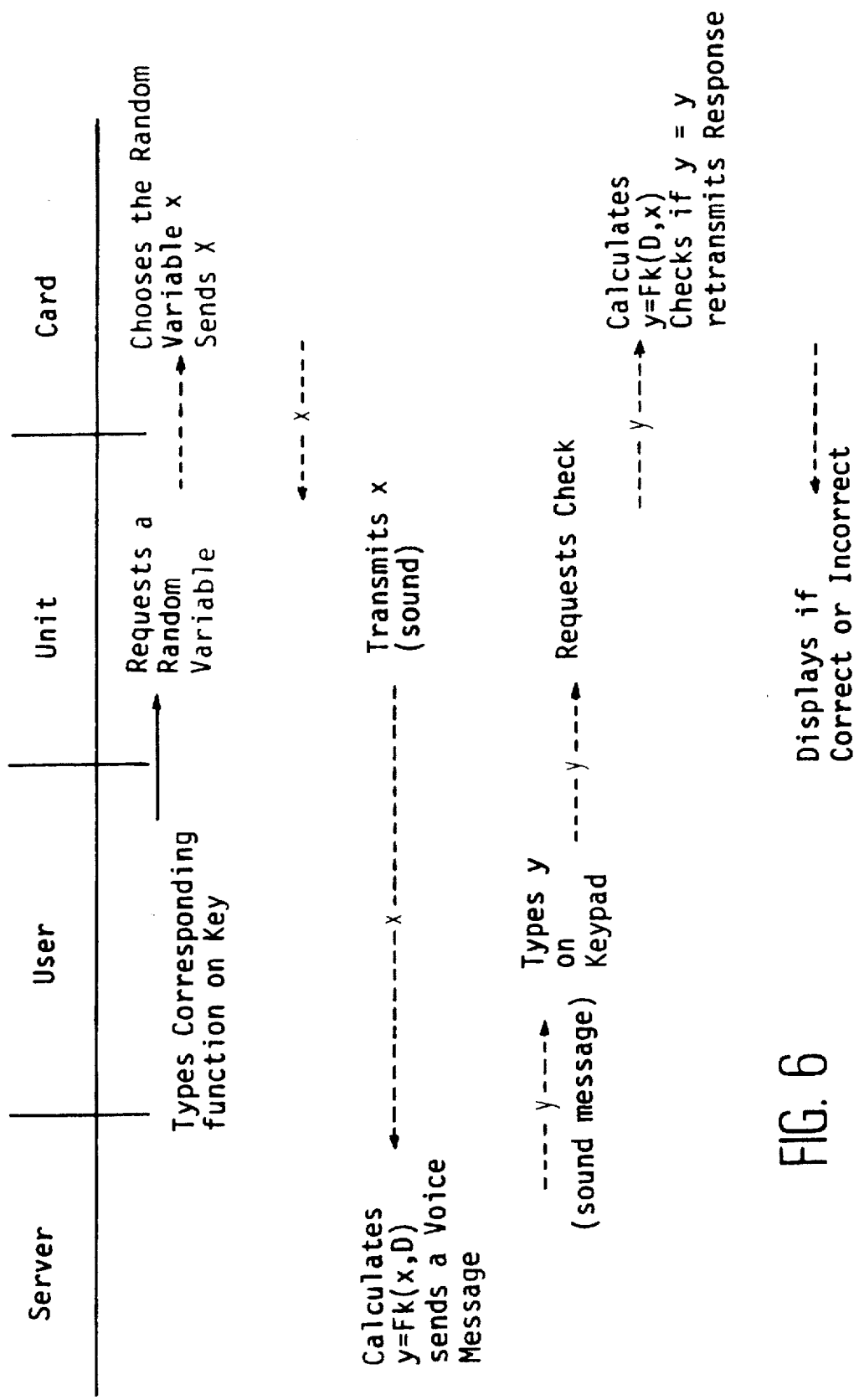
FIG. 6 shows a third message exchange diagram between a server and a card.

The corresponding operations are illustrated in FIG. 6:

the user types on the key corresponding to the "server authentication" function, the unit requests the card to draw a random number, the card chooses a random number x and transmits it to the unit, the unit transmits a sound signal permitting the transmission of x to the server, the server calculates a number y equal to $Fk(x,D)$, the server transmits by voice message the number y, the user types y on the keypad, the unit transmits y to the card and requests the checking with the number y' calculated by the card with $y'=Fk(D,x)$, the card controls the display on the display screen of the result of the comparison: correct or incorrect.

As a variant, this function could also be implemented using the function b) of the card. The unit would request the card to perform the same calculation as that which it has requested of the server and would itself check the identity of the two results, instead of this taking place in the card.

e) Inscription of a right in the card

Figure 7:
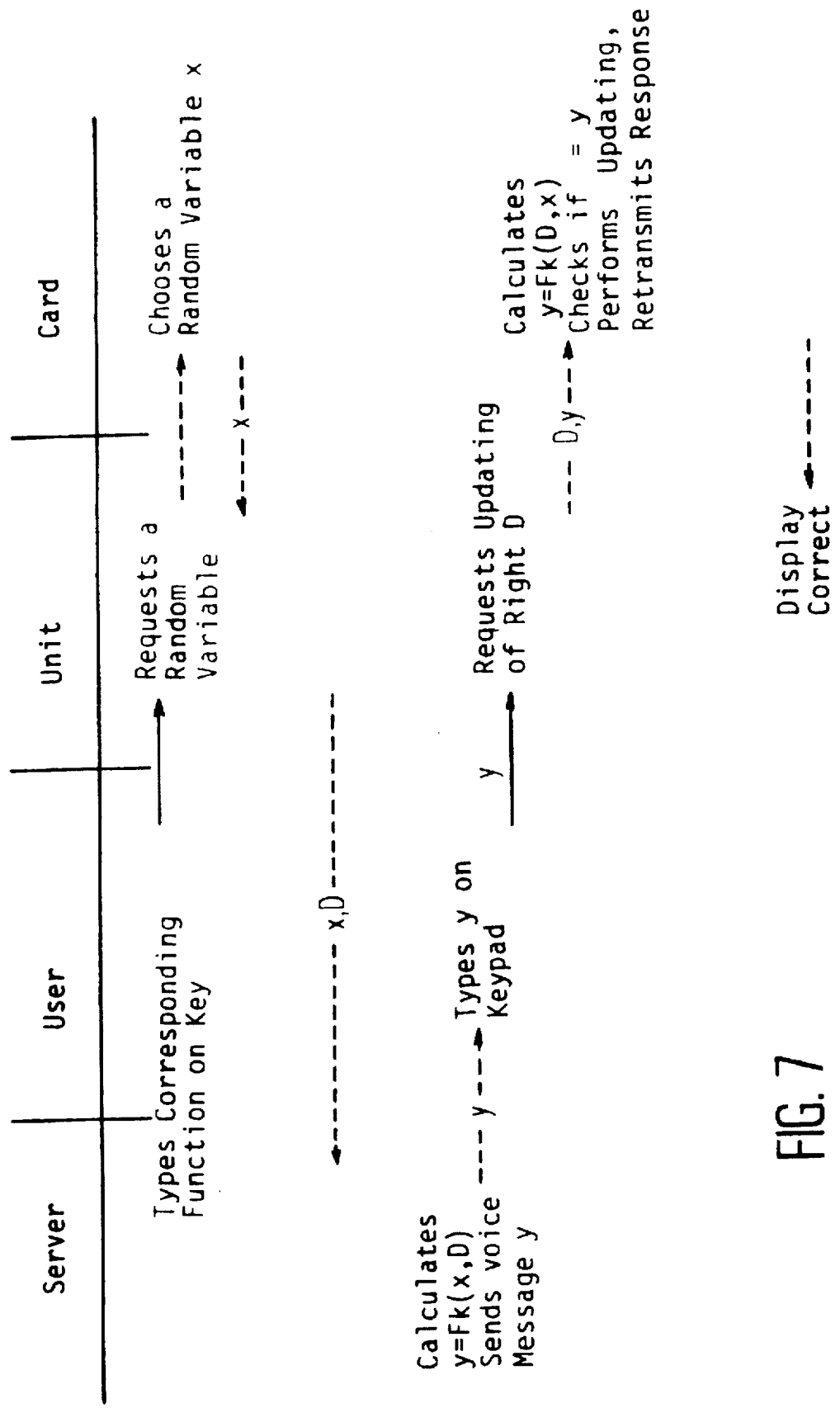
FIG. 7 shows a fourth message exchange diagram between a server and a card.

It is a question of inscribing or entering in the card a piece of information, e.g. a right D, which only the authorized server has the right to write or update using an appropriate code. An example of this function is the refilling or reloading of a cash card. The operations are illustrated in FIG. 7:

the user types on the keypad the key appropriate for this function, the unit requests the card to draw a random number, the card draws a random variable x and transmits it to the unit, the unit sends to the server by means of sound signals both x and the right D, the server calculates a number y equal to $Fk(x,D)$ and sends y by voice message, the user types y on the keypad, the unit requests from the card an updating of the right D and transmits to it D and y, the card calculates $y'=Fk(D,x)$ and checks whether y' is equal to y and in the affirmative the card updates D and retransmits a response to the unit, the unit displays the response: correct or incorrect.

We claim:

1. A smart card based system for telephone-securized transactions comprising:

a telephone terminal comprising, a loudspeaker, and a transmitter, said telephone terminal being connected to a server by way of a telephone network;

a smart card configured to calculate security parameters using a security function operation mechanism stored therein; and a portable securing device configured to connect to the smart card and to secure a transaction between a user of the portable securing device and the server by performing a bidirection information exchange operation between the server and the smart card, said portable securing device comprising, a keypad, a display, an internal sound signal transmitter that is configured to produce acoustic energy therefrom that is directly received by said transmitter of said telephone terminal;

a bus configured to couple the smart card to the keypad, the display, and the internal sound signal transmitter, wherein, said information exchange operation using a communications channel from said server to said smart card comprising, a link between said server and said loudspeaker where said server produces voice signals indicative of data produced at said loudspeaker and recognizable by said user, and a link between said user and said keypad where said user enters said data on said keypad in response to said data being produced at said loudspeaker, said keypad passing said data via said bus to said smart card, and said information exchange operation using another communications channel from said smart card to said server comprising, a link between said internal sound signal transmitter and said transmitter of said telephone terminal, and a link between said telephone terminal and said server.

2. The system of claim 1, wherein said internal sound signal transmitter comprises a DTMF signal transmitter.

* * * * *